(12) United States Patent
Maalouf et al.

(10) Patent No.: US 10,409,405 B2
(45) Date of Patent: Sep. 10, 2019

(54) SYSTEMS AND METHODS FOR ACHIEVING TRUE FULL SCREEN DISPLAY IN HANDHELD TERMINALS

(71) Applicants: Ramzi Khalil Maalouf, Chevy Chase, MD (US); Jinrong Yang, Chevy Chase, MD (US)

(72) Inventors: Ramzi Khalil Maalouf, Chevy Chase, MD (US); Jianping Ling, Shanghai (CN); Tao Wang, Shanghai (CN); Xianqi Liu, Shanghai (CN); Jinrong Yang, Shanghai (CN); Shuquan Zhang, Douglaston, NY (US); Chin Hung Lo, Taipei (TW)

( * ) Notice: Subject to any disclaimer, the term of this patent is extended or adjusted under 35 U.S.C. 154(b) by 0 days.

(21) Appl. No.: 15/709,054

(22) Filed: Sep. 19, 2017

(65) Prior Publication Data

US 2019/0079614 A1   Mar. 14, 2019

Related U.S. Application Data

(60) Provisional application No. 62/555,673, filed on Sep. 8, 2017.

(51) Int. Cl.
*H04M 1/00* (2006.01)
*G06F 3/041* (2006.01)
(Continued)

(52) U.S. Cl.
CPC .............. *G06F 3/0412* (2013.01); *G06F 1/16* (2013.01); *G06F 3/0414* (2013.01); *G06F 3/14* (2013.01); *G06F 3/147* (2013.01); *H04M 1/02* (2013.01)

(58) Field of Classification Search
CPC .................................................... G06F 1/1628
See application file for complete search history.

(56) References Cited

U.S. PATENT DOCUMENTS

| 2005/0049019 A1 | 3/2005 | Lee |
| 2006/0044743 A1* | 3/2006 | Ito ........................... G06F 1/162 361/679.26 |

(Continued)

FOREIGN PATENT DOCUMENTS

| CN | 203368547 | 12/2013 |
| CN | 104601757 | 5/2015 |

OTHER PUBLICATIONS

International Search Report and Written Opinion, PCT/US2017/05230, dated Feb. 21, 2018.

*Primary Examiner* — Nan-Ying Yang
(74) *Attorney, Agent, or Firm* — Chris D. Thompson

(57) ABSTRACT

A hand-held terminal such as a smart phone comprised of 2 components—a front face and a back face. A touch screen display is embedded in the front face entirely occupying said front face; said front face to have no visible components in its top and bottom strips including the home button, speakers, microphone, sensors, and front camera ("Components"). The back face contains the relocated Components as well as substantially all the other smart phone elements. The intent is to achieve a true full panel display that covers the entire face of the device. Disclosed are embodiments to make the Components fully accessible and functional, including an integrated back panel slider mechanism, a built-in spring loaded module, and an integrated flip component. The front panel display space now includes the top and bottom strip areas and becomes a true full screen display covering the entire face of the device.

15 Claims, 5 Drawing Sheets

(51) Int. Cl.
*H04M 1/02* (2006.01)
*G06F 3/14* (2006.01)
*G06F 1/16* (2006.01)
*G06F 3/147* (2006.01)

(56) References Cited

U.S. PATENT DOCUMENTS

| | | | |
|---|---|---|---|
| 2006/0046796 A1* | 3/2006 | Park | H04M 1/0239 |
| | | | 455/575.4 |
| 2007/0007077 A1* | 1/2007 | Goldberg | A45F 5/00 |
| | | | 182/230 |
| 2008/0058010 A1* | 3/2008 | Lee | H04M 1/0264 |
| | | | 455/556.1 |
| 2009/0176542 A1* | 7/2009 | Matsuoka | H04M 1/0235 |
| | | | 455/575.4 |
| 2009/0233660 A1 | 9/2009 | Demuynck | |
| 2010/0232097 A1 | 9/2010 | Clerc | |
| 2010/0321526 A1* | 12/2010 | Yoon | A61F 9/08 |
| | | | 348/231.2 |
| 2014/0347330 A1* | 11/2014 | Kim | G06F 1/1637 |
| | | | 345/184 |
| 2016/0366255 A1 | 12/2016 | Chu et al. | |

* cited by examiner

SYSTEMS AND METHODS FOR ACHIEVING TRUE FULL SCREEN DISPLAY IN HANDHELD TERMINALS

RELATED APPLICATIONS

This application claims priority to U.S. Provisional Application No. 62/555,673 entitled "HANDHELD TERMINAL WITH AN INTEGRATED SLIDING BACK PANEL TO ACHIEVE FULL SCREEN DISPLAY," filed Sep. 8, 2017, the entire content of which is incorporated herein by reference.

BACKGROUND

1. Technical Field

This invention concerns portable electronic devices having displays, such as mobile communication devices, tablets, smart terminals and the like; and in particular a means for maximizing the available display space on the front of such a device, particularly, a smart phone. Traditionally, smart phones have been considered as a single operating unit. This invention seeks to separate the smart phone into 2 distinct components—a front touch screen panel with a true full display that covers the entire face of the device, and a back panel that contains substantially all of the components of the smart phone.

2. Description of the Related Art

Smart phone screens seem to have settled on an optimum upper size of around 6 inches for comfortable palming use. To maximize this valuable "real estate" however, the trending design is now focused on achieving a display that covers the entire face of the device. That requires removing components that take up visible space in the top and bottom strips of the front panel screen. Even if one day there is reliable technology to placing some of the components such as sensors and speakers beneath the touch screen panel such that they become invisible, the present front facing camera would have to remain. Consequently, the space occupied by these components makes it impossible for the actual "usable" display to cover the full entire visible face of the device. The result is a loss of valuable display space and a noticeable lack of design elegance and color coordination, all of which are important consumer considerations in the competitive high end smart phones war. What is needed is a convenient and comprehensive solution for maximizing the smart phone display to cover the entire face of the device, without any loss in accessibility or functionality.

SUMMARY OF EMBODIMENTS

With respect to the above problem, the present invention aims to provide a set of solutions to provide physical design features that allow a smart phone display to cover the entire face of the device, without any loss in accessibility or functionality.

In the present invention, the front face is defined as a touch screen display panel which contains no visible components on any part of the screen and particularly on its top and bottom strips, including the home button, speakers, microphone, sensors, front camera, or other such devices (collectively, "Components").

In the present invention, the back face is defined as the back panel containing the Components as defined above and substantially all the other elements comprising the smart phone including the sensors, battery, SoC, cameras, chips, speakers, modems, and other such devices.

One embodiment of the invention provides a seamlessly integrated hand-held terminal such as a smart phone comprised of a front touch panel screen, a back panel, and a spring loaded slider mechanism in between. The Components are relocated from the front panel to the top and bottom strips of the back panel. In normal (sleep) mode, the Components are covered by the front panel whose edges are flush with those of the back panel. When the Components are needed, the user slides the back panel up or down past the front panel edges, via the integrated spring loaded slider mechanism, sufficiently to reveal the Components in the top or bottom strips of the back panel. Built-in sensors and contactors detect the sliding motion and activate the said Components that are normally in sleep mode. For example, when the back panel is slid up, the front camera screen will turn on in the same way as when the camera icon is pressed on the smart phone application screen. When the Components are no longer needed, the user slides the back panel into position (flush with the front panel) and the Components revert back to their original sleep state.

Another embodiment of the invention provides a seamlessly integrated hand-held terminal such as a smart phone comprised of a front touch panel screen, a back panel, and a built-in housing. The Components are relocated from the front panel to a module within the back panel. The back panel has an opening on its to frame or on its side frame to accommodate a built-in housing with a spring loaded module ("Housing Module") containing the Components. In normal (sleep) mode, the Components module is hidden within the top or side frames of the back panel such that the top of the Housing Module is flush with the back panel frame. When the components are needed, the user presses down on the top of the Housing Module and the Components module is revealed such that the bottom of the Housing Module is now flush with the frame of the back panel. Built-in sensors and contactors detect the upward motion of the Housing Module and activate the Components that are normally in sleep mode. When the Components are no longer needed, the user pushes down on the top of the Housing Module and the Housing Module retracts back into its original position within the back panel and the Components revert back to their original sleep state.

Another embodiment of the invention also provides a seamlessly integrated hand-held terminal such as a smart phone comprised of a front touch panel screen, a back panel, and an integrated flip component ("Flip Module"). The Components are relocated from the front panel to a module in the back panel. The back panel has an opening located at its top or side edges. The opening is occupied by a spring loaded housing module containing the Components. The Components module is hinged on the side closest to the back panel frame. In the normal state of this Flip Module, the integrated Components housing is locked-in to the back panel and actively functions as a normal rear camera system. When the Components are needed for front facing functions, the user releases the Flip Module or sends a signal to the electrical actuators (which are operably coupled to Flip Module's hinged side) to release the Flip Module and cause a 180 degree rotational movement about the back panel vertical or horizontal axes.

Other aspects of the invention will become apparent by consideration of the detailed description and accompanying drawings.

BRIEF DESCRIPTION OF THE DRAWINGS

The design of the device as proposed separates the front panel module from the back panel module. All the (visible) Components such as the home button, speakers, microphone, sensors, or front camera, or other components are relocated from the top and bottom strips of the front panel to the back panel.

The invention provides different embodiments and methods to locate the Components on or within the back panel and make them fully accessible and functional.

The front and back panels may have equal dimensions but different depths, and are independent modules that are seamlessly integrated to function together as a smart phone. During normal state, the Components are dormant in some embodiments and active in others. When any of the mechanisms disclosed are activated and motion is sensed, the normally open relays close and become energized and send a signal to the processor and communication modules to automatically activate the Components if they are in a dormant state (FIG. 1-9), or to change their functions if they are in an already active state (FIG. 10-15).

Figure 1:
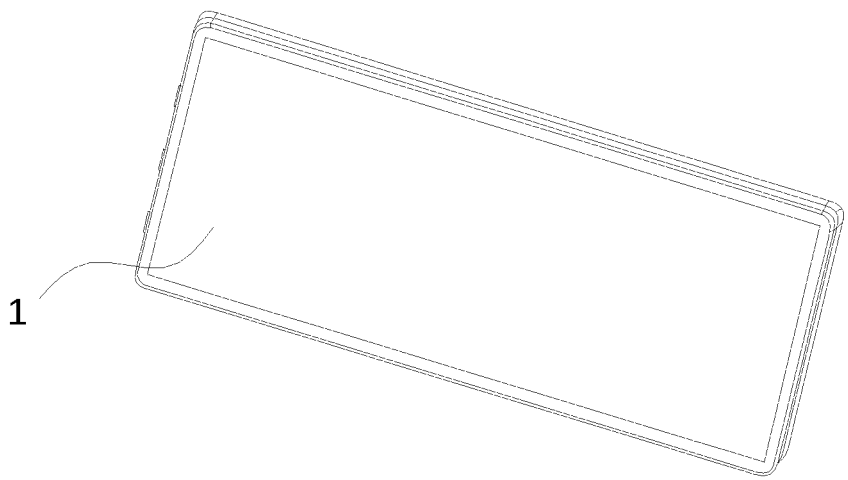

FIG. 1—disclosure of the integrated spring loaded slider mechanism—is a view of the front panel with true full screen display.

Figure 2:
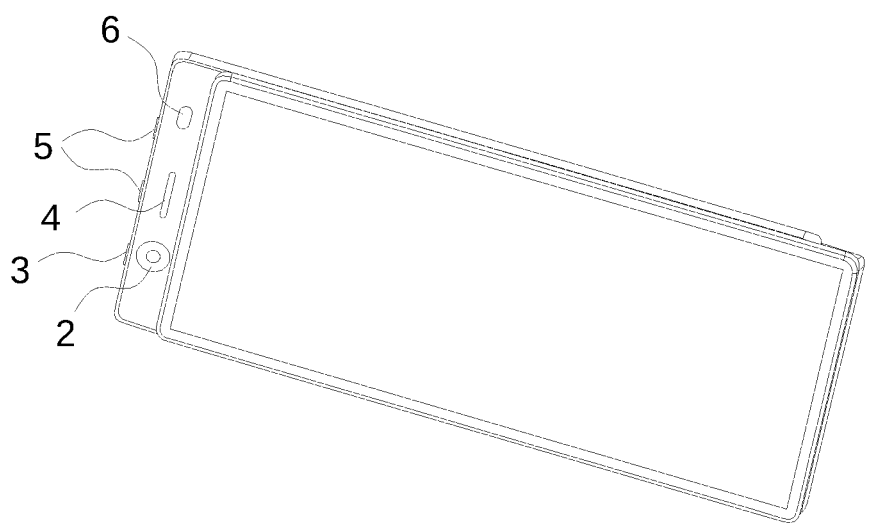

FIG. 2.—disclosure of the integrated spring loaded slider mechanism—is a front view of the back panel slid up.

Figure 3:
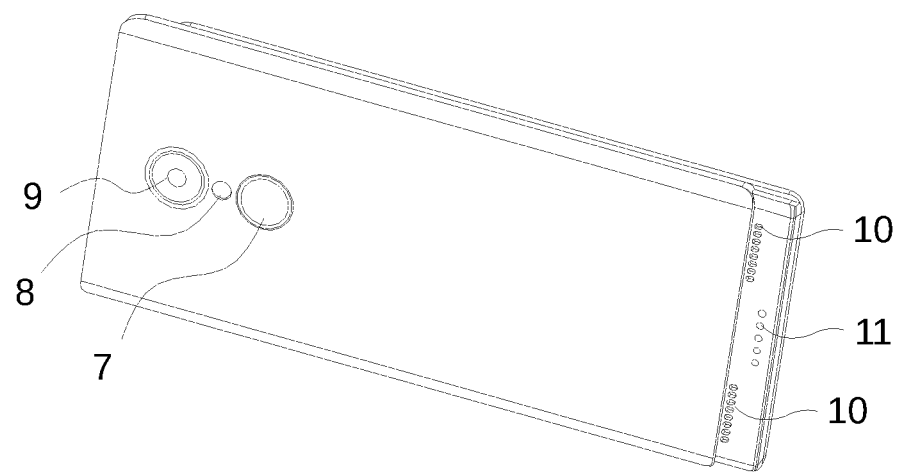

FIG. 3.—disclosure of the integrated spring loaded slider mechanism—is a back view of the back panel slid up.

Figure 4:
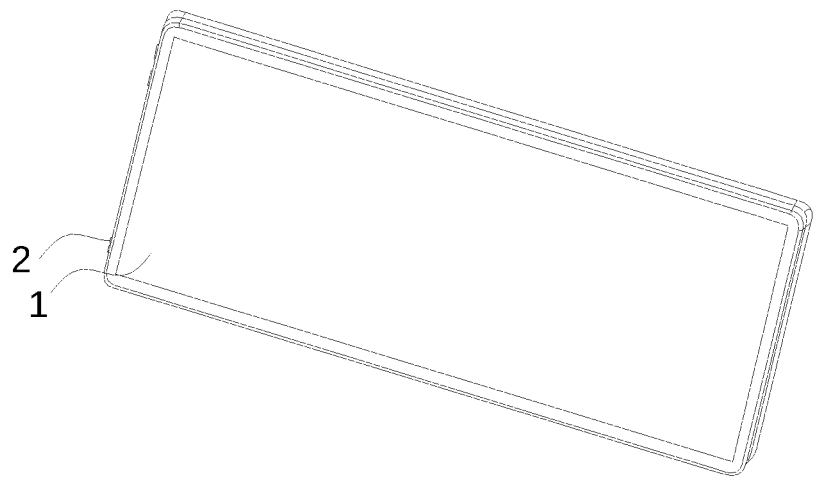

FIG. 4.—disclosure of the top built-in spring loaded housing—is a view of the front panel with true full screen display.

Figure 5:
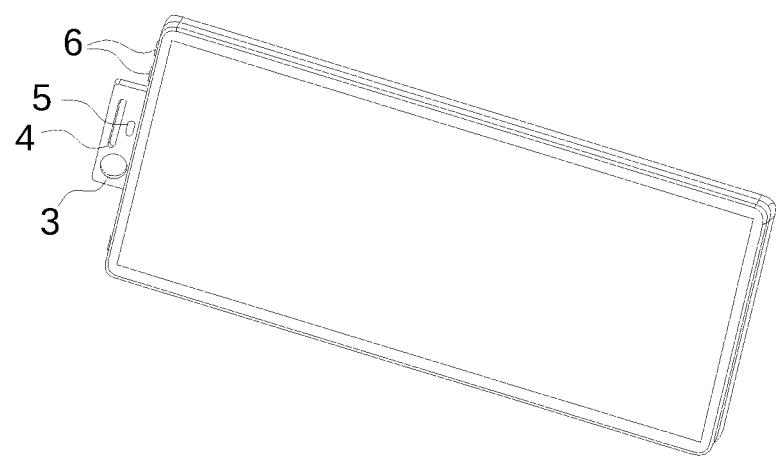

FIG. 5.—disclosure of the top built-in spring loaded Housing Module—is a front view of the top component sprung out.

Figure 6:
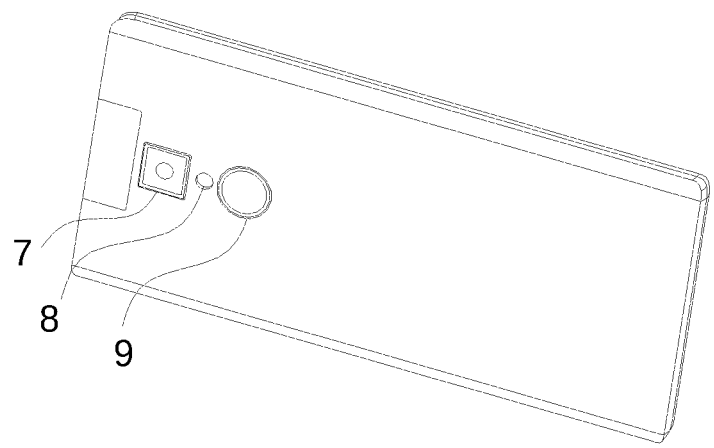

FIG. 6.—disclosure of the top built-in spring loaded Housing Module—is a back view of the top component closed.

Figure 7:
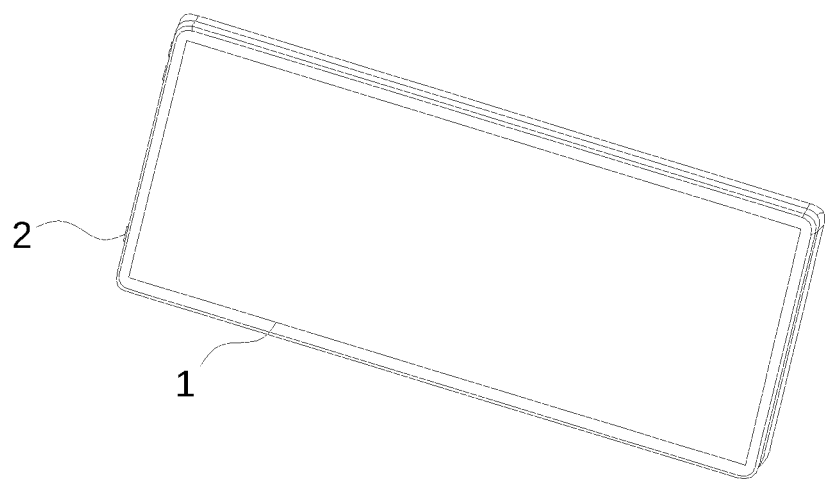

FIG. 7.—disclosure of the side built-in spring loaded housing—is a view of the front panel with true full screen display.

Figure 8:
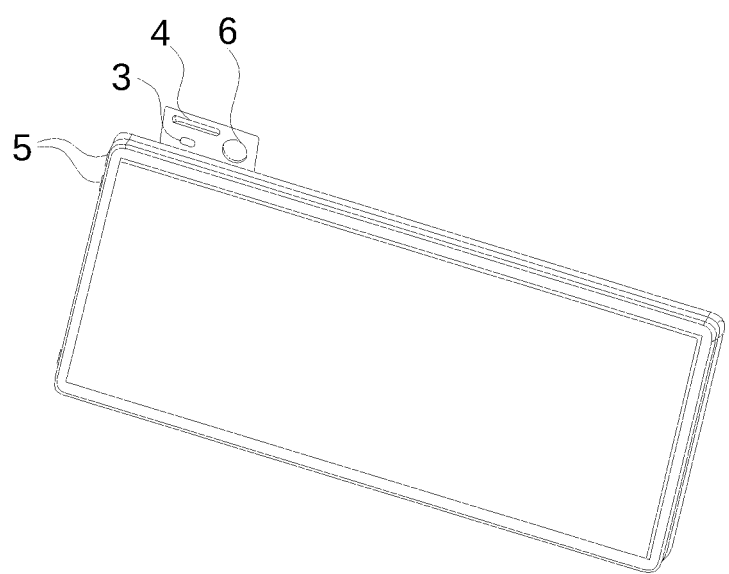

FIG. 8.—disclosure of the side built-in spring loaded Housing Module—is a front view of the side component sprung out.

Figure 9:
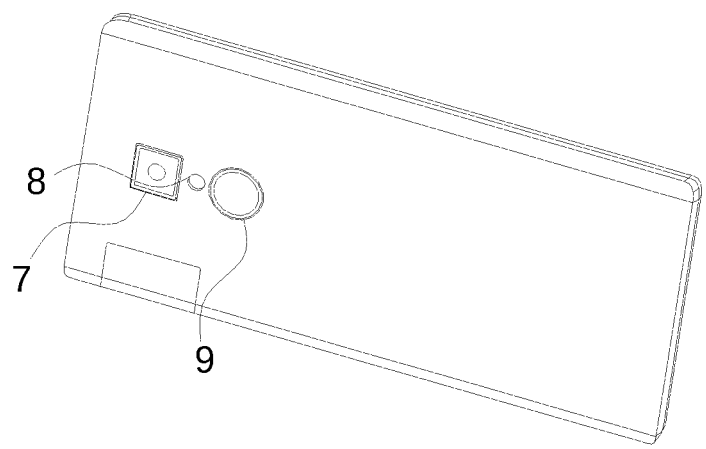

FIG. 9.—disclosure of the side built-in spring loaded Housing Module—is a back view of the side component closed.

Figure 10:
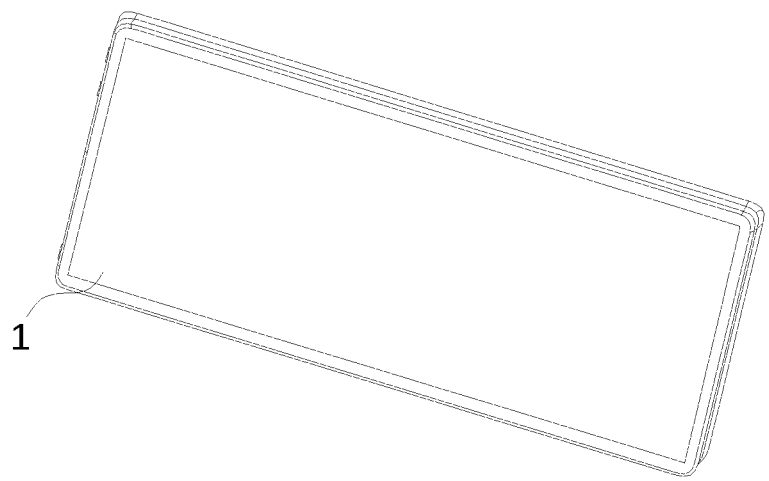

FIG. 10.—disclosure of the top integrated flip mechanism—is a view of the front panel with true full screen display.

Figure 11:
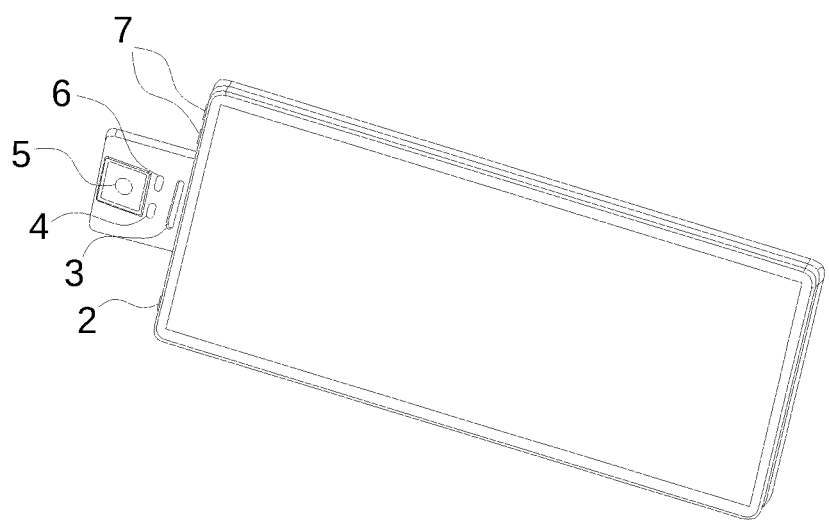

FIG. 11.—disclosure of the top integrated flip mechanism—is a front view of the component flipped up 180 degrees.

Figure 12:
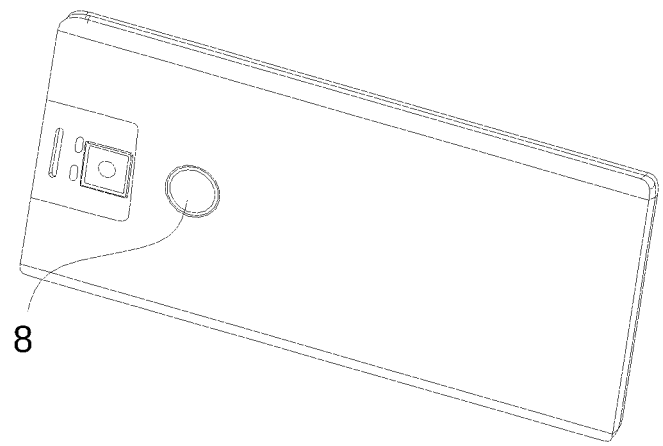

FIG. 12.—disclosure of the top integrated flip mechanism—is a back view of the component closed.

Figure 13:
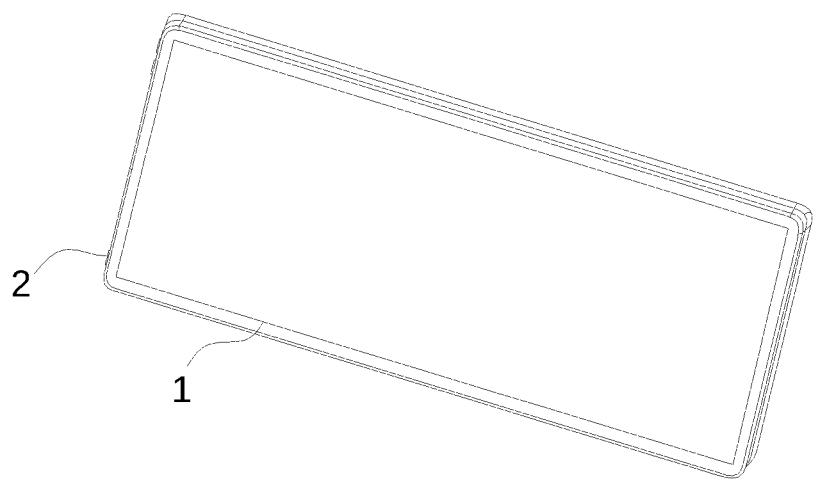

FIG. 13.—disclosure of the side integrated flip mechanism—is a view of the front panel with true full screen display.

Figure 14:
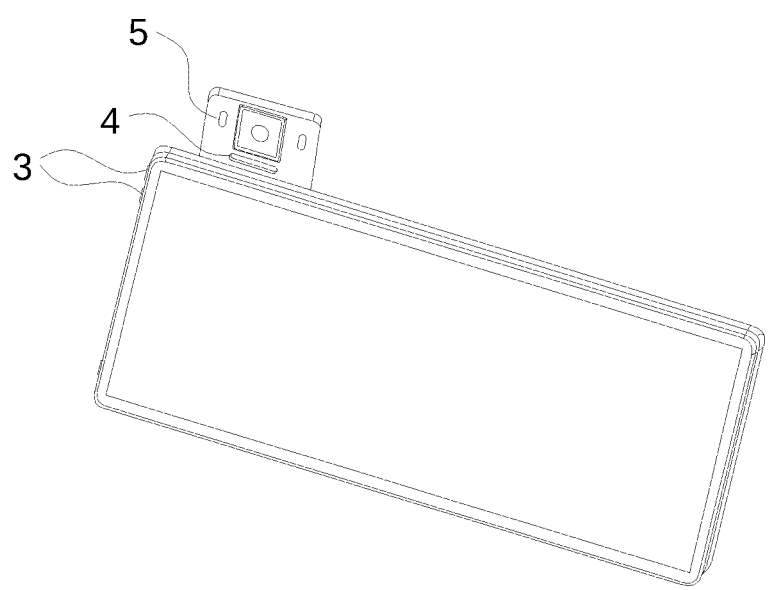

FIG. 14.—disclosure of the side integrated flip mechanism—is a front view of the component flipped up 180 degrees.

Figure 15:
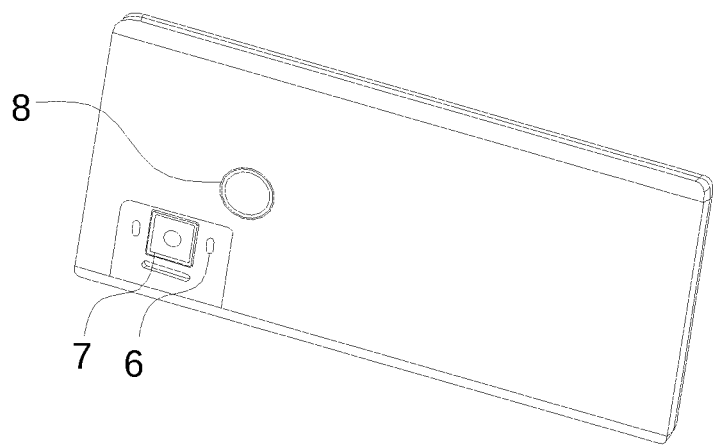

FIG. 15.—disclosure of the side integrated flip mechanism—is a back view of the component closed.

DETAILED DESCRIPTION OF EMBODIMENTS

For brevity and ease of description, each of the exemplary systems presented herein is illustrated with a single exemplar of each of its component parts. Some examples may not describe or illustrate all components of the systems, but a person of ordinary skill in the art will recognize whether such components are needed. Other exemplary embodiments may include more or fewer of each of the illustrated components, may combine some components, or may include additional or alternative components. Again, a person of ordinary skill in the art will recognize omissions that would be obvious to the person of ordinary skill in the art.

FIG. 1-15 further described below are diagrams of three different exemplary embodiments of a portable electronic device. In each embodiment illustrated, the portable electronic device is a mobile phone. In other embodiments, the portable electronic device can include other types of devices (for example, tablets, smart terminals, and the like). In some embodiments, the mobile phone includes a spring loaded slider mechanism. Further, the mobile phone in each embodiment includes an electronic processor (for example, a microprocessor, or other electronic controller), a memory, a microphone, a speaker, the camera, and electrical actuators which include, for example, electrical motors (collectively, "Electronics"). The electronic processor, the memory, as well as the other various modules are advantageously coupled by a bus, are coupled directly, by one or more additional control or data buses, or a combination thereof.

The memory may include read only memory (ROM), random access memory (RAM), other non-transitory computer-readable media, or a combination thereof. The electronic processor is configured to retrieve instructions and data from the memory and execute, among other things, instructions to perform the methods described herein. The microphone captures audio data and the speaker outputs audio data.

The communication network may be implemented using various networks, for example, a cellular network, the Internet, a Bluetooth™ network, a wireless local area network (for example, Wi-Fi), a wireless accessory Personal Area Networks (PAN), cable, an Ethernet network, satellite, a machine-to-machine (M2M) autonomous network, and a public switched telephone network.

The spring loaded slider mechanism ("Slider Mechanism") relates to a mechanism in which the inward face of the front panel is coupled to a fixed plate and the inward face of the back panel is coupled to a sliding plate such that the back panel is able to slide up or down against the front panel. A spring mechanism is installed on each end at the location desired to lock the back panel into its new position. There are numerous commonly used slider mechanisms which would work for this purpose and a person of ordinary skill in the art will recognize the components that are needed.

In FIG. 1-3 the smart phone device includes, among other, a front panel, a back panel, and an integrated spring loaded slider mechanism ("Slider Mechanism") in between. FIG. 1. is a view of the front panel with true full screen display. The power button 3 and the volume buttons (5) are located on the top frame of the back panel. Whenever the Components are needed, the user slides the back panel up, revealing in this embodiment on the front view (FIG. 2.) the front camera 2, the flash 6, and the ear speaker 4 and on the back view (FIG. 3.) the speakers 10 and the magnetic charger 11, in addition to the fingerprint sensor 7, the rear camera 9 and the flash 8. As soon as the smart phone is slid up, the motion is detected by the broken contacts which cause a change the Slider Mechanism's relay state from its normally open state to a closed state and the Electronics activate the Components which were in sleep mode.

In FIGS. 4-6 the smart phone device includes, among other, a front panel, a back panel, and a top built-in spring loaded housing ("Housing Module"). FIG. 4. is a view of the front panel with true full screen display 1. The power button 2 and the volume buttons (6) are located on the top frame of the back panel. When the Components are needed, the user presses down on the top of the spring loaded housing and the Components module is revealed such that the bottom of the Components module is now flush with the frame of the back panel, revealing in this embodiment on the front view (FIG. 5.) the front camera 3, the flash 5, and the ear speaker 4. FIG. 3. is a view of the back panel with the Housing Module in closed position and displays the fingerprint sensor 9, the rear camera 7 and the flash 8. As soon as the housing is pressed and is released up, the motion is detected as a result of the broken contacts which cause a change in the Housing Module's relay state from its normally open state to a closed state and the Electronics activate the Components which were in sleep mode.

FIGS. 7-9 are similar to FIG. 4-6 except for the location of the which is now built-in to the side of the back panel frame instead of to the top frame.

In FIGS. 10-12 the smart phone device includes, among other, a front panel, a back panel, and an integrated top flip component ("Flip Module"). FIG. 10. is a view of the front panel with true full screen display (1). The power button 2 and the volume buttons 7 are located on the top frame of the back panel. FIG. 12. is a back view of the Flip Module in its normal state, wherein the integrated Components housing is locked-in to the back panel and functions as the rear camera FIG. 11—(5), with flash FIG. 11—(6), 2nd lens FIG. 11—(4) and ear speaker FIG. 11—(3), and also displays the fingerprint sensor FIG. 12—(8). When the Components are needed for front facing functions, the user (mechanically or electronically) prompts or sends a signal to the electrical actuators which are operably coupled to Flip Module's hinged side (the one closest to the top back panel frame) to release the Flip Module and cause a 180 degree rotational movement about the back panel vertical axis. In some embodiments, the electronic processor controls the movement of the Flip Module via a graphical user interface (GUI) displayed on the front panel touch-screen display. In such case, the electronic processor receives a signal from the front panel touch-screen display indicating a request from a user to rotate the Flip Module. In response to receiving the signal, the electronic processor sends a signal to the electrical actuators which cause the Flip Module to rotate 180 degree about the back panel vertical axis. The Components module is now fully exposed and flush with the frame of the back panel, in the same plane as the front panel, revealing in this embodiment on the front view FIG. 11. the front camera 5, the flash 6, the 2nd lens 4 and the ear speaker (3). As soon as the Flip Module is released, the detected rotational motion causes the Electronics to change the Flip Module's relay state from its normal state to its other state, i.e., from functioning as a rear camera system to a front camera system, respectively.

FIG. 13-15 are similar to FIGS. 10-12 except for the location of the Flip Module which is now integrated close to the side edge of the back panel frame instead of to the top edge.

These disclosures are not limited in their application to the examples provided, the embodiments discussed, or to the details of construction and the arrangement of Components set forth in the foregoing description or drawings. The disclosure is capable of other embodiments and of being practiced or of being carried out in various ways, improving the available display area as a person of ordinary skill in the art will readily recognize.

What is claimed is:

1. A method for manufacturing a mobile communications device with a display area covering substantially an entire full face of the device, comprising:
providing a device case of hand-holdable size, said device case comprising a front face and a back face;
embedding in the front face of said device case a touch screen display panel entirely occupying said front face except for rims surrounding said display panel; said touch screen display panel having no visible components therein;
providing in the back face of said device case an inwardly facing back panel comprising a front camera and one or more additional components comprising a flash and at least one of: one or more speakers, a microphone, and one or more sensors, wherein the inwardly facing back panel is selectively presentable to a user on the front of the mobile communication device by the user's sliding the inwardly facing back panel relative to the front face of the device case, and
providing a CPU configured to:
receive a signal when the inwardly facing back panel is slid relative to the front face of the device case such that the front camera is exposed to the user;
when the inwardly facing back panel is slid relative to the front face of the device case such that the front camera is exposed to the user, activate an active camera mode in which the front camera in the inwardly facing back panel is active and a front camera display screen is displayed on the touch screen display panel;
receive a signal when the inwardly facing back panel is slid relative to the front face of the device case such that the front camera is hidden from the user; and
when the inwardly facing back panel is slid relative to the front face of the device case such that the front camera is hidden from the user, enter a sleep camera mode in which the front camera in the inwardly facing back panel is not active and the front camera display screen is not displayed on the touch screen display panel,
wherein the user has the option to activate the camera mode either by sliding the inwardly facing back panel relative to the front face of the device case or by pressing a button on the touch display screen panel.

2. The method of claim 1, further comprising:
embedding the front camera within a top strip area of the back panel's inside face.

3. The method of claim 2, further comprising:
embedding the one or more sensors, the front camera, one or more flash memory devices, and at least one of the speakers within the top strip area of the back panel's inside face.

4. The method of claim 1, further comprising:
embedding one or more components within a bottom strip area of the back panel's inside face.

5. The method of claim 1, further comprising:
embedding a slider mechanism between the inward face of the front panel and the inward face of the back panel of the mobile communication device, such that the back panel can alternately be slid up against the front panel to expose components on the top strip area or slid down against the front panel to expose components on the bottom strip area.

6. The method of claim 5, further comprising:
providing an electronic relay electrically coupled to the back panel's inner face and to the slider mechanism; and
providing a transmitter electrically coupled to the electronic relay; and
providing an electronic processor electrically coupled to the CPU configured to:
receive a signal from the transmitter whenever the electronic relay changes state between open and closed as a result of a sliding movement of the back panel; and
send a signal to the CPU to change the mode between sleep and active of at least one of the components located within the top or bottom strips of the back panel's inward face.

7. A method for manufacturing a mobile communications device with a display area covering substantially an entire full face of the device, comprising:
providing a device case of hand-holdable size, said device case comprising a front face and a back face;
embedding in the front face of said device case a touch screen display panel entirely occupying said front face except for rims surrounding said display panel; said touch screen display panel having no visible components therein;
providing, coupled with the device case, a movable camera module comprising a camera and one or more additional components comprising a flash, wherein the movable camera module is slidable or hingeable relative to the device case, wherein the camera and the flash of the movable camera module are selectively presentable to a user on the front of the mobile communication device while the touch screen display panel is facing the user, and
providing a processor configured to:
receive a signal when the movable camera module is moved such that the camera and flash are presented to the user; and
change, based at least in part on the signal, a mode for the camera between sleep and active mode or between a front camera mode and a rear camera mode, wherein the mode for the camera changes depending on the position or orientation of the movable camera module.

8. The method of claim 7, further comprising:
wherein providing the movable camera module coupled to the device case comprises embedding a spring-loaded housing module in the device case, wherein the built-in spring loaded housing module comprises a housing at least partially hidden within the top frame of the back panel such that said housing springs up and sits on the top face of the back panel whenever the user releases said housing.

9. The method of claim 7, further comprising:
wherein providing the movable camera module coupled to the device case comprises embedding a spring-loaded housing module in the device case, wherein the built-in spring loaded housing module comprises a housing at least partially hidden within the side frame of the back panel such that said housing springs up and sits on the side face of the back panel whenever the user releases said housing.

10. The method of claim 8, further comprising embedding in the device case:
an electronic relay electrically coupled to the bottom side of the built-in spring loaded housing module; and
a transmitter electrically coupled to the electronic relay; and
wherein the processor is configured to:
receive a signal from the transmitter whenever the electronic relay changes state between open and closed as a result of a movement of the housing module; and
change the mode between sleep and active of at least one of the components located within the housing module.

11. The method of claim 7, further comprising:
wherein providing the movable camera module coupled to the device case comprises integrating a flip module at least partially embedded within an opening on the outward face of the back panel proximate to the top face of the back panel; wherein the flip module is hinged on one side such that, in response to a user action or command, the flip module is rotatable 180 degrees on its hinged side.

12. The method of claim 7,
wherein providing the movable camera module coupled to the device case comprises integrating a flip module at least partially embedded within an opening on the outward face of the back panel proximate to the side face of the back panel; wherein the flip module is hinged on one side such that, responsive to a user action or command, the flip module is rotatable 180 degrees on its hinged side.

13. The method of claim 11, further comprising:
wherein the camera is adjustable to function normally as the mobile device's back camera component.

14. The method of claim 11, further comprising embedding in the device case:
an electronic relay electrically coupled to the back of the flip module and to the back face of the back panel; and
a transmitter electrically coupled to the electronic relay; and
an electrical actuator operably coupled to the flip module's hinged side; and
wherein the processor is configured to:
receive a signal from the transmitter whenever the electronic relay changes state between open and closed as a result of a movement of the flip module;
send a signal to the electrical actuator to release and rotate the flip module 180 degrees; and
change the mode between sleep and active for at least one of the components located within the flip module and further for the camera, to change its function from a rear camera to a front camera.

15. A mobile communications device with a display area covering substantially an entire full face of the device, comprising:
a device case of hand-holdable size, said device case comprising a front face and a back face;
a touch screen display panel embedded in the front face of said device case, the touch screen display panel entirely occupying said front face except for rims surrounding said display panel; said touch screen display panel having no visible components therein;
an inwardly facing back panel in the back face of said device case, the inwardly facing back panel comprising a front camera and a flash and one or more additional components comprising at least one of: one or more speakers, a microphone, and one or more sensors, wherein the inwardly facing back panel is selectively presentable to a user on the front of the mobile communication device by the user's moving the inwardly facing back panel relative to the front face of the device case; and a CPU configured to:
- receive a signal when the inwardly facing back panel is slid relative to the front face of the device case such that the front camera is exposed to the user;
- when the inwardly facing back panel is slid relative to the front face of the device case such that the front camera is exposed to the user, activate an active camera mode in which the front camera in the inwardly facing back panel is active and a front camera display screen is displayed on the touch screen display panel;
- receive a signal when the inwardly facing back panel is slid relative to the front face of the device case such that the front camera is hidden from the user; and
- when the inwardly facing back panel is slid relative to the front face of the device case such that the front camera is hidden from the user, enter a sleep camera mode in which the front camera in the inwardly facing back panel is not active and the front camera display screen is not displayed on the touch screen display panel, wherein the user has the option to activate the camera mode either by sliding the inwardly facing back panel relative to the front face of the device case or by pressing a button on the touch display screen panel.

* * * * *